(12) United States Patent
Finley et al.

(10) Patent No.: US 6,928,353 B2
(45) Date of Patent: Aug. 9, 2005

(54) SYSTEM AND METHOD FOR PROVIDING DATA TO A MACHINE CONTROL SYSTEM

(75) Inventors: Jeffrey L. Finley, Metamora, IL (US); Michael C. Gatz, Chillicothe, IL (US); John T. Grober, Dunlap, IL (US); David R. Kweram, Holly Springs, NC (US); Robert J. Price, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/210,821

(22) Filed: Aug. 1, 2002

(65) Prior Publication Data

US 2004/0024510 A1 Feb. 5, 2004

(51) Int. Cl.⁷ .............................................. G06F 17/00
(52) U.S. Cl. ........................... 701/50; 701/2; 455/419; 717/172
(58) Field of Search .................. 701/50, 35, 2, 701/36; 172/2, 4; 455/419, 420, 423; 717/172, 173, 177, 178, 171

(56) References Cited

U.S. PATENT DOCUMENTS

| | | | |
|---|---|---|---|
| 4,744,218 A | 5/1988 | Edwards et al. | 60/638 |
| 4,811,561 A | 3/1989 | Edwards et al. | 60/638 |
| 5,113,344 A | 5/1992 | Kellogg et al. | 701/35 |
| 5,249,140 A | 9/1993 | Kessler | 700/3 |
| 5,261,495 A | 11/1993 | Szymczak | 172/2 |
| 5,322,129 A | 6/1994 | Sheeter | 172/2 |
| 5,557,510 A | 9/1996 | McIntyre et al. | 700/17 |
| 5,608,271 A | 3/1997 | Saka et al. | 307/10.1 |
| 5,687,081 A | 11/1997 | Wellman et al. | 701/50 |
| 5,692,376 A | 12/1997 | Miki et al. | 60/328 |
| 5,774,876 A | 6/1998 | Woolley et al. | 705/28 |
| 5,867,801 A | 2/1999 | Denny | 701/35 |
| 5,889,671 A | 3/1999 | Autermann et al. | 700/83 |
| 5,890,086 A | 3/1999 | Wellman et al. | 701/50 |
| 5,918,195 A | 6/1999 | Halgrimson et al. | 702/94 |
| 5,931,882 A | 8/1999 | Fick et al. | 701/50 |
| 6,006,148 A | 12/1999 | Strong | 701/33 |
| 6,061,614 A | 5/2000 | Carrender et al. | 701/33 |
| 6,061,617 A | 5/2000 | Berger et al. | 701/50 |
| 6,105,679 A | 8/2000 | Schubert et al. | 172/4 |
| 6,107,917 A | 8/2000 | Carrender et al. | 340/505 |
| 6,119,054 A | 9/2000 | Miki et al. | 700/275 |
| 6,144,910 A | 11/2000 | Scarlett et al. | 701/50 |
| 6,148,255 A | 11/2000 | van der Lely | 701/50 |
| 6,167,337 A | 12/2000 | Haack et al. | 701/50 |
| 6,205,384 B1 | 3/2001 | Diekhans | 701/50 |
| 6,230,089 B1 | 5/2001 | Lonn et al. | 701/48 |
| 6,236,924 B1 | 5/2001 | Motz et al. | 701/50 |
| 6,249,727 B1 * | 6/2001 | Muller | 701/36 |
| 6,269,292 B1 | 7/2001 | Kokubu et al. | 701/35 |

* cited by examiner

*Primary Examiner*—Tan Q. Nguyen
(74) *Attorney, Agent, or Firm*—Kelsey L. Milman; Liell L McNeil

(57) ABSTRACT

A system and method for updating parameter data available to a machine control system. A work machine having an implement attached thereto includes a machine control system for controlling the machine and the implement and for providing additional functionality, such as mapping and payload systems, to the machine. The machine control system is configurable for operation of a variety of work implements. Data associated with the attached work implement is retrieved from a remote system and utilized to adjust the machine control system to accommodate the attached implement.

20 Claims, 2 Drawing Sheets

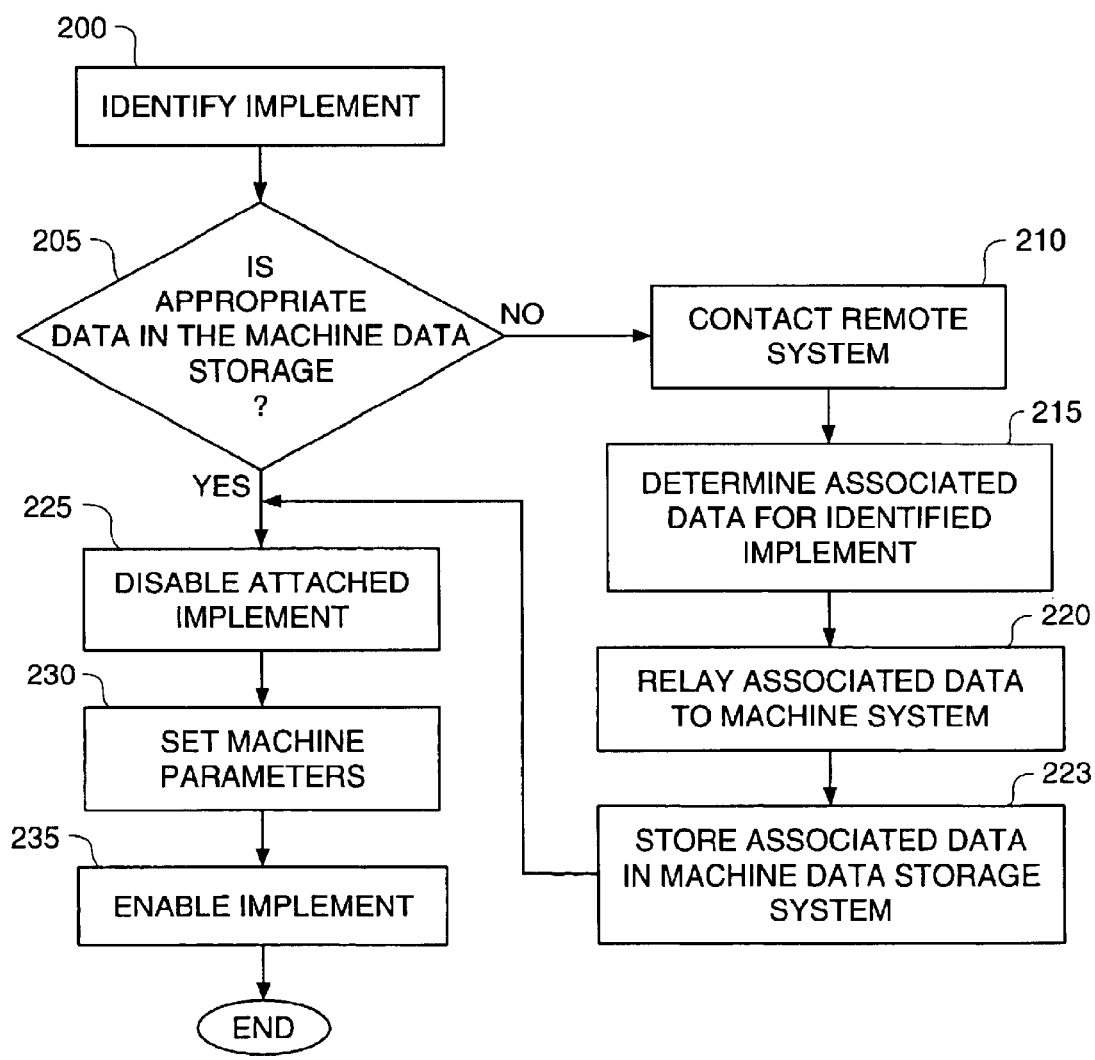

SYSTEM AND METHOD FOR PROVIDING DATA TO A MACHINE CONTROL SYSTEM

TECHNICAL FIELD

This invention relates generally to an implement recognition and control system for use on a work machine and, more particularly, to a system and method for updating data related to an implement and to machine control.

BACKGROUND

Work machines such as integrated tool carriers, skid steer loaders, agricultural tractors, excavators and the like typically have a large number of hydraulically controlled work implements that are attachable or mountable to the particular work machine to perform a particular work function. These work implements are typically controlled through one or more hydraulic systems which actuate and control the implement lift and/or tilt mechanisms. In addition, these work implements or attachments are likewise controlled through the use of various operator input devices such as one or more implement control levers, foot pedals, or an implement control joystick.

All of these different implements available for attachment to work machines differ in the way they are controlled, and their hydraulic flow and pressure requirements likewise may vary. The operating pressures and flow rates associated with one tool may vary drastically when compared with the operating pressures and flow rates of another tool. For example, some work tools must be operated at a system pressure of 3000 psi, whereas other tools only need to operate at system pressures of 1000 psi. Further, at times, depending upon the particular work tool involved and the particular application or task being performed by such work tool, full hydraulic flow to the particular work tool is not always necessary. Under certain operation conditions, less than full or maximum flow is desirable. Still further, some older work tools cannot operate at the pressures and flow rates associated with newer tools.

In addition, the attached work tool is controlled by an operator input device, such as one or more control levers, foot pedals, or a joystick. Operation of the input device may be affected by which implement is attached to the machine; for example, for a first implement, operation of the input device may cause the implement to operate in a first manner, while, for a second implement, operation of the input device in the same manner may cause the implement to operate in a second manner.

Further, in certain situations, the operator input device that controls movement of the machine may also be affected by use of a particular work tool. For example, certain work tools used on certain types of work machines require high engine speed in order to operate the work tool properly. These higher operating engine speeds produce a higher output flow from the hydraulic pump which controls the respective drive motors or drive mechanisms associated with the work machine. Generally, with a higher the engine speed, the pump flow available to the drive motors or drive mechanism also increases, which creates a more responsive, less controllable machine. At a result, when these types of work tools are used, it is sometimes very difficult to control the steering of a particular work machine, particularly in space limited environments.

Still further, many types of work implements, such as buckets, are available in various sizes having differing dimensions and capacities. The dimensions and/or capacity of the attached implement may be germane to various machine systems, such as for example mapping systems which calculate the amount of material removed in a digging pass.

It is well known to provide a system for allowing the hydraulic pressure, flow rate, and other parameters, such as for example bucket capacity, to be modified or adjusted to accommodate different implements or increase their efficiency as they are attached to the machine. However, such a system requires that a multitude of parameter data be stored on the machine so that the parameters may be optimized for any attached implement. This may be difficult in an environment such as rental products in which a wide variety of implements may be available for rental in conjunction with a machine.

Accordingly, the present invention is directed to overcoming one or more of the problems as set forth above.

SUMMARY OF THE INVENTION

It is to be understood that both the foregoing general description and the following detailed description are exemplary and explanatory only and are not restrictive of the invention as claimed.

In a first embodiment, a method for updating parameter data for a work machine is disclosed. The method comprises the steps of identifying an attached implement, determining if the identified implement has associated data in the machine data storage system, and, if not, retrieving the associated data from a remote system.

In a second embodiment, a system for updating parameter data for a work machine is disclosed. The system comprises an indicator for identifying an implement attached to the work machine, a machine communications system for retrieving data associated with the attached implement, and a machine data storage system for storing the associated data.

In a third embodiment, a system for modifying a machine control system of a work machine, the work machine having an implement attached thereto, is disclosed. The system comprises an indicator for identifying the implement attached to the work machine, a machine processor for determining if data associated with the identified implement is stored on the machine, and a machine communications system for retrieving the associated data if it is not stored on the machine, wherein the machine control system includes at least one machine control for controlling operation of the machine, the machine control being adjustable based on the associated data.

BRIEF DESCRIPTION OF THE DRAWINGS

The accompanying drawings illustrate exemplary embodiments of the invention and, together with the description, serve to explain the principles of the invention.

FIG. 2 is a flow chart of an exemplary embodiment of a method, consistent with the present invention, for updating data stored on a machine.

DETAILED DESCRIPTION

Figure 1:
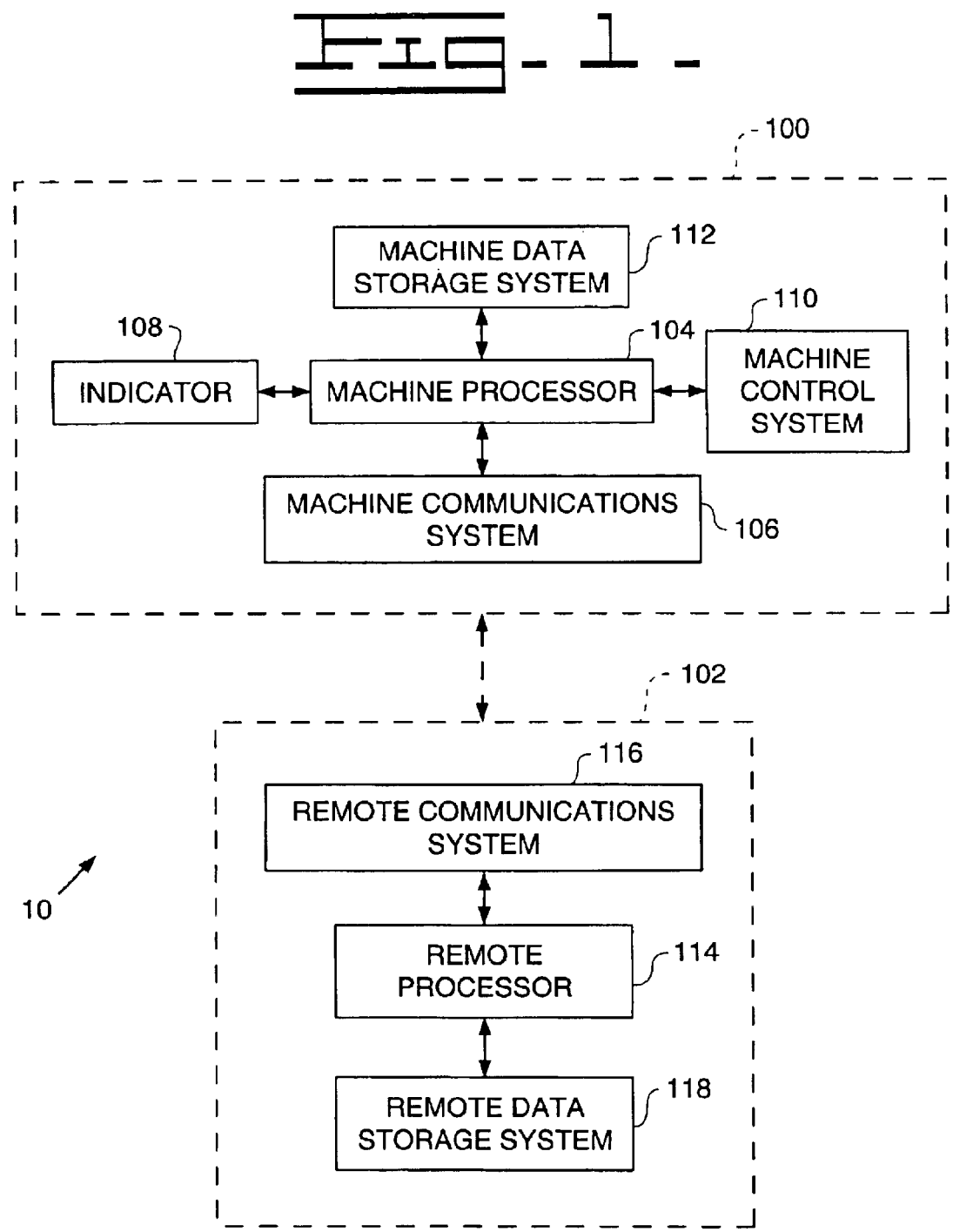
FIG. 1 is a block diagram of a system for updating data stored on a machine consistent with an exemplary embodiment of the present invention.

Reference will now be made in detail to embodiments of the invention, examples of which are illustrated in the accompanying drawings. Whenever possible, the same reference numbers will be used throughout the drawings to refer to the same or like parts.

FIG. 1 illustrates a system consistent with an exemplary embodiment of the present invention, which is generally designated 10. For purposes of this disclosure, the present invention is described in connection with a work machine, such as a track-type tractor, excavator, grader, paver, or the like. However, the present invention is equally well-suited for use with other equipment or machines having a control and/or other machine systems.

The system 10 preferably includes a machine system 100 and a remote system 102. The machine system 100 is preferably mounted on the work machine. Alternatively, the machine system 100 may have a portion located on the machine and a portion located remotely from the machine, or the entire machine system 102 may be located remotely from the machine. The remote system 102 is preferably located remotely from the work machine.

In a first embodiment, the machine system 100 includes a machine processor 104, a machine communications system 106, an indicator 108, a machine control system 110, and a machine data storage system 112. The machine processor 104 controls the functions of the machine system 100 and processes data received from or sent to the remote system 102 via the machine communications system 106. The machine processor 104 may be comprised of a single control unit, or it may be comprised of a more complicated control system, such as one utilizing numerous control modules or servers (possibly remotely-located), depending on the complexity of the machine system 100 needed for specific applications.

The machine communications system 106 preferably is operably connected to the machine processor 104 and communicates with the remote system 102. Preferably, the machine communications system 106 communicates by wireless communication means, such as satellite, cellular, or radio frequency technology, which are well-known by those skilled in the art. However, the communication system 106 may include an alternate communication means, such as a modem with access to public telephone lines.

The indicator 108 is operably connected to the machine processor 104 and identifies the implement currently attached to the work machine. Preferably, the various implements which may be associated with a particular work machine each include a unique or specific identification code recognizable by the indicator 108 when the implement is attached to the work machine. This indicator 108 may be comprised of an appropriate scanner or reader such as an optical, laser, or magnetic scanner or reader which is positioned to read the specific identification code associated with the implement and relay the code to the machine processor 104 or otherwise recognize the attached implement. The code may be a linear bar code, a two-dimensional code, or other coding system for identifying the implement. Alternatively, the code could be incorporated into a plug and socket arrangement wherein the associated pin pattern would be unique to the specific implement and serve as an identification code for that particular implement which could again be relayed to the machine processor 104.

Still further, the indicator 108 could comprise a radio frequency ("RF") telemetry system. In such a case, the implement would include appropriate electronics and circuitry to output an RF signal encoded with a specific identification code unique to that particular implement to be received by the indicator in the form of an RF receiver positioned for reading the RF signal and located on the body of the machine. The RF receiver would translate the signal received from the implement into an identification code, the signal being indicative of the particular type of implement mounted to the work machine, and this code would be relayed to the machine processor 104. Alternatively, the indicator 108 may be comprised of operator commands by which one of the available implements may be selected by an operator via a computer menu (not shown) or by other selection means.

The machine control system 110 is operably connected to the machine processor 104. Preferably, the machine control system 110 includes a variety of machine controls which direct the operation of the machine and the implement; in addition, the machine control system 110 may include other machine systems, such as for example a mapping system for monitoring the depth of a digging pass or a payload system for calculating load volumes. Typically, operation of the implement is controlled through hydraulic lift and tilt cylinders which operate the attached implement. A drive mechanism of the machine is controlled through transmission control valves. The flow of hydraulic fluid to the various valves and cylinders of the machine control system 110 can be controlled by one or more operator devices (not shown), such as levers, foot pedals, joysticks, or the like. Further, a plurality of switches, such as directional flow, high flow, and continuous flow switches, preferably located in the operator compartment, control the flow of hydraulic fluid to various cylinders and actuators. As different implements often operate at different hydraulic pressures and flow rates and as operating conditions, such as engine speed, of the machine may be varied based on the attached implement, the hydraulic and other control systems may be adjusted for operation of a particular implement.

The machine data storage system 112 is operably connected to the machine processor 104 and provides stored data to the machine processor 104. The machine data storage system 112 preferably is comprised of a database or other storage means capable of storing data detailing the appropriate parameter data, such as, for example, hydraulic pressure, flow rate, control of operator input devices, implement volume, implement physical dimensions and the like, which may be used to adjust the machine controls and other desired settings in the machine control system 110. The various machine parameters associated with an implement may be stored in the machine data storage system 112 in, for example, the form of one or more records, look-up tables, operating maps, algorithms, or the like such that when a particular implement is recognized by the machine processor 104, the machine processor 104 may access the appropriate machine parameters and relay them to the machine control system 110 where the parameters are utilized to set or adjust the various machine conditions and settings, such as flow rates, pressures, operation of switches, operation of operator devices, implement volume, and implement physical dimensions. Additional operating conditions may also be reconfigured based upon the needs of a particular implement. For example, the range of motion of a particular linkage, the steering gain, and the maximum speed of the machine may additionally be modified to enhance productivity of a particular implement. The machine data storage system 112 is preferably located on the machine, although it may be remote from the machine. In addition, the machine data storage system 112 may be comprised of a single database, or it may be comprised of a plurality of databases located on one or more computing devices or servers; the machine data storage system 112 may further comprise a processor or controller (not shown) for managing the storage of data.

The remote system 102 is preferably comprised of a remote processor 114, a remote communications system 116, and a remote data storage system 118. The remote processor 114 controls the functions of the remote system 102 and processes data received from or sent to the remote system 102 via the remote communications system 116. The remote processor 114 may be comprised of a single control unit, or it may be comprised of a more complicated control system, such as one utilizing numerous servers, depending on the complexity of the remote system 102 needed for specific applications.

Preferably, the remote communications system 116 is operably connected to the remote processor 114 and communicates with the machine system 100 by wireless communication means, such as satellite or cellular technology, which are well-known by those skilled in the art. However, the remote communications system 116 may include an alternate communication means, such as a modem with access to public telephone lines.

The remote data storage system 118 preferably includes, at least, storage space for parameter data associated with a wide variety of implements. The remote data storage system 118 may be comprised of a single database in which the parameter data is stored. Alternatively, the remote data storage system 118 may be comprised of a plurality of databases stored on one or more computers or servers; in addition, the remote data storage system 118 may further comprise a processor or controller (not shown) to manage the storage of data within the system. Preferably, the remote data storage system 118 is operably connected to and accessible by the remote processor 114 of the remote system 102.

Operation of the system 10 is controlled by software that is programmed into the machine and remote processors 104 and 110 by external means. Alternatively, the program can be implemented via hardware or any other programming technique. Creation of this software based upon the description set forth in the specification is within the capabilities of one having ordinary skill in the programming arts. Based upon the present disclosure, those skilled in the art will appreciate that the programming could include software that could be characterized as implement data retrieval software programming that is operable to electronically retrieve data specific to an implement over a communication link from a remote data storage system. In addition, the programming would preferably also include software as described that could be characterized as implement identification software that is operable to identify an implement attached to the work machine. Finally, the programming could also preferably include software as described that could be characterized as implement determination programming that is operable to determine if the machine control system has associated data for the attached implement available to the machine processor.

As seen in FIG. 2, a method for updating the parameter data stored in the machine system is disclosed. Initially, as seen in control block 200, the implement attached to the machine is identified. The machine controller 104 will attempt to identify the particular implement by interpreting the associated specific identification code, which is preferably obtained by the indicator 108. This code is generated by appropriate circuitry or other electronics associated with the implement such as, for example, the various coding and telemetry systems discussed above. Alternatively, the indicator may determine the unique code through an operator input, such as through a computer menu, a switch, or other operator selectable means associated with the machine, as previously discussed.

As seen in control block 205, the machine data storage system 110 is examined to determine if the appropriate parameter data is present based upon the identified implement. Preferably, the machine processor 104 accesses the machine data storage system 110 and compares the unique code or identifier associated with the attached implement with those stored in the machine data storage system 112 in order to determine if the parameter data associated with the identified implement is stored in the machine system 100.

If, as seen in control block 210, the associated data is not stored in the machine system 100, then the remote system 102 is contacted, preferably, via the machine and remote communications systems 106 and 116. Preferably, the machine communications system 106 relays a request by the machine processor 104 to the remote communications system 116. As seen in control block 215, the associated data for the attached implement is determined, the associated data being that which corresponds to the attached implement. To determine the associated data, the request from the machine processor 104 may comprise the unique code or identifier associated with the attached implement, the unique code also identifying the associated data. Preferably, the remote communications system 116 receives the request from the machine communications system 106 and directs the request to the remote processor 114. The remote processor 114, utilizing the relayed unique code, searches the remote data storage system 118 for the associated data. When it is identified, as seen in control block 220, the associated data is retrieved from the remote data storage system 118 and relayed to the machine system 100 via the remote and machine communications systems 116 and 106. Thus, those skilled in the art will recognize that the data retrieval process can be accomplished electronically without the necessity of physically bringing a memory storage device to the work machine, as in the prior art. Then, as seen in control block 223, the associated data is stored in the machine data storage system 112.

Once the appropriate data is present in the machine data storage system 112, whether by retrieval from the remote system 102 or from being previously stored in the machine system 100, then, as seen in control block 225, the attached implement is preferably disabled, although the implement need not be disabled depending on the parameters to be configured. Preferably, the machine processor 104 relays a signal to the machine control system 110 indicating that the implement should be disabled, and one or more hydraulics or controls in the machine control system 110 are disabled.

Then, as seen in control block 230, the machine parameters are set or adjusted. Within the machine control system 110, the appropriate hydraulic and other control systems of the machine are reconfigured based upon the associated parameters stored in the machine data storage system 112. More particularly, the implement joystick and/or the drive control joystick may be reconfigured, the operation of any control switches may be reconfigured, and the hydraulic pressures and flow rates may be reconfigured. In addition, other machine parameters may be reconfigured based upon the preferred operating conditions of the identified implement, such as for example establishing a new maximum forward speed for the machine or establishing a new steering control gain or correlation based upon movement of the drive control joystick. Further, other machine parameters, such as the implement volume or physical dimensions, may be set to accommodate additional systems, such as mapping or payload systems, in the machine control system 110.

Once all of the appropriate machine parameters have been reconfigured or reprogrammed, then, as seen in control block 235, the implement is enabled for use. The implement may be enabled by the machine processor 104 sending a signal to the machine control system 110 to enable the hydraulics and/or controls of the implement, or the operator may be allowed or instructed to enable the implement via an operator input.

Industrial Applicability

The present invention enables a work machine to operate effectively and efficiently with a variety of work tools. Machines such as, for example, track type tractors or excavators, may be capable of operating a variety of work tools in order to perform a variety of functions. However, each of the work tools often has different machine settings at which its functionality is best utilized. It can be difficult for an owner or operator of a work machine to ensure that the machine's operation is configured for the particular attached work tool, especially in situations, such as rental yards, in which a wide variety of tools may be available for use with the machine. In addition, for a variety of systems, such as mapping or payload systems, additional information about the attached implement is desirable in order for these systems to calculate and display more accurate information.

In the present invention, once-the attached work tool is identified, the machine processor 104 checks to determine if the appropriate machine data is stored in the machine data storage system 112. If it is not, the machine processor requests the data from a remote system 102, which preferably has stored parameter data associated with all available work tools. The data associated with the attached work tool is relayed to the machine system 100 and stored in the machine data storage system 112. Then, the parameter data is available for setting the hydraulic, control, and other systems of the machine control system 110 in order to increase the work efficiency of the attached implement and provide more accurate information to the systems.

It will be readily apparent to those skilled in the art that various changes and modifications of an obvious nature may be made, and all such changes and modifications are considered to fall within the scope of the appended claims. Other embodiments of the invention will be apparent to those skilled in the art from consideration of the specification and practice of the invention as disclosed herein. It is intended that the specification and examples be considered as exemplary only, with a true scope and spirit of the invention being indicated by the following claims and their equivalents.

What is claimed is:

1. A method for updating parameter data for a work machine, comprising the steps of:

identifying an attached implement;

determining if the identified implement has associated data in a machine data storage system for the work machine; and if not, retrieving the associated data electronically from a remote system that is remote from the work machine, and the electronic retrieval being accomplished via a communication link originating from a machine processor to a remote processor of the remote system, and the communication link including at least one of a wireless communication means and a public telephone line.

2. The method, as set forth in claim 1, further including the steps of:

storing the retrieved associated data in the machine data storage system; and setting at least one machine parameter based on the retrieved data.

3. The method, as set forth in claim 1, further including the steps of:

disabling the implement at least in part via the machine processor;

setting at least one machine parameter based on the retrieved data; and enabling the implement at least in part via the machine processor.

4. The method, as set forth in claim 1, wherein the implement is identified by an indicator.

5. The method, as set forth in claim 4, wherein the indicator includes an operator input.

6. The method, as set forth in claim 4, wherein the indicator includes identifying step is performed at least in part via a radio frequency telemetry system.

7. A system for updating machine data for a work machine, comprising:

a remote data storage system that is remote from the work machine, and that includes data associated with a plurality of work machine implements;

an indicator for identifying an implement attached to the work machine;

a machine communications system for electronically retrieving data associated with the attached implement, and being operable to communicate with the remote system at least in part by establishing a communication link between a machine processor and a remote processor of the remote system, and the communication link including at least one of a wireless communication means and a public telephone line; and a machine data storage system for storing the associated data, and being operably connected to the work machine.

8. The system, as set forth in claim 7, further including:

a machine control system having at least one machine parameter, wherein the machine parameter is set based on the associated data.

9. The system, as set forth in claim 8, wherein the associated data is retrieved from the remote data storage system for storage in the machine data storage system.

10. The system, as set forth in claim 7, wherein the indicator includes an operator input.

11. The system, as set forth in claim 7, wherein the indicator includes a radio frequency telemetry system.

12. A system for modifying a machine control system of a work machine, the work machine having an implement attached thereto, comprising:

an indicator for identifying the implement attached to the work machine;

a machine processor for determining if data associated with the identified implement is available;

a machine communications system for electronically retrieving the associated data from a remote data storage system that is remote from the work machine, if it is not available, and the machine communications system being operable to establish a communication link between a machine processor and a remote processor of the remote system, and the communication link including at least one of a wireless communication means and a public telephone line, wherein the machine control system includes at least one machine control for controlling operation of the machine, the machine control being adjustable based on the associated data.

13. The system, as set forth in claim 7, wherein the indicator includes an operator input.

14. The system, as set forth in claim 7, wherein the indicator includes a radio frequency telemetry system.

15. The system, as set forth in claim 12, further including:
a remote data storage system for storing the associated data.

16. The system, as set forth in claim 15, wherein if the associated data is not available, the machine processor disables the implement prior to the machine communication system's retrieval of the associated data.

17. The system, as set forth in claim 16, wherein the associated data is stored remotely from the machine for retrieval by the machine communications system.

18. A work machine comprising:
a machine control system that includes a machine processor and an implement data retrieval software programming operable to establish a communication link to electronically retrieve data specific to an implement over the communication link from a remote data storage system, and the communication link includes at least one of a wireless communication means and a public telephone line; and the remote data storage system being remote from the work machine.

19. The work machine of claim 18 wherein the communications link includes a wireless communication link originating from the work machine.

20. The work machine of claim 18 wherein the machine control system includes implement identification software programming operable to identify an implement attached to the work machine to the machine processor; and the machine control system includes implement determination software programming operable to determine if the machine control system has associated data for the attached implement available to the machine processor.

* * * * *